US007970237B2

(12) United States Patent
Miller

(10) Patent No.: US 7,970,237 B2
(45) Date of Patent: Jun. 28, 2011

(54) SPATIALLY-VARYING CONVOLUTIONS FOR RENDERING GLOSSY REFLECTION EFFECTS

(75) Inventor: Gavin S. P. Miller, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1000 days.

(21) Appl. No.: 11/832,312

(22) Filed: Aug. 1, 2007

(65) Prior Publication Data

US 2009/0034874 A1 Feb. 5, 2009

(51) Int. Cl.
*G06K 9/64* (2006.01)
*G06T 15/50* (2011.01)

(52) U.S. Cl. .......................... 382/279; 345/426

(58) Field of Classification Search .............. 382/203, 382/260, 264, 266, 279, 312; 345/502, 581–582, 345/589, 606, 613, 426; 716/21; 250/559.17
See application file for complete search history.

(56) References Cited

U.S. PATENT DOCUMENTS

| | | | | |
|---|---|---|---|---|
| 4,197,583 A * | 4/1980 | Westell et al. | ................. | 382/264 |
| 4,905,296 A * | 2/1990 | Nishihara | ..................... | 382/203 |
| 4,912,336 A * | 3/1990 | Nayar et al. | ............. | 250/559.17 |
| 5,031,132 A * | 7/1991 | Dolazza | ........................ | 708/315 |
| 5,808,620 A | 9/1998 | Doi et al. | | |
| 6,587,114 B1 * | 7/2003 | Peercy et al. | .................. | 345/582 |
| 6,753,859 B1 | 6/2004 | Segal | | |
| 6,771,263 B1 | 8/2004 | Behrens et al. | | |
| 6,795,076 B2 * | 9/2004 | Deering et al. | ................. | 345/502 |
| 6,950,109 B2 * | 9/2005 | Deering | ......................... | 345/589 |
| 6,956,570 B2 | 10/2005 | Munshi | | |
| 7,012,615 B2 | 3/2006 | Kraemer | | |
| 7,023,438 B2 | 4/2006 | Lokovic | | |
| 7,030,878 B2 | 4/2006 | Xu et al. | | |
| 7,328,425 B2 * | 2/2008 | Olsson et al. | ................... | 716/21 |
| 7,751,642 B1 * | 7/2010 | Persson | ......................... | 382/266 |
| 2003/0058241 A1 | 3/2003 | Hsu | | |

(Continued)

FOREIGN PATENT DOCUMENTS

EP 0 447 226 9/1991

OTHER PUBLICATIONS

Amanatides, J., "Ray Tracing with Cones," Computers and Graphics UK, vol. 18, No. 3, Jul. 1984.

(Continued)

*Primary Examiner* — Kanji Patel
(74) *Attorney, Agent, or Firm* — Robert C. Kowert; Meyertons, Hood, Kivlin, Kowert & Goetzel, P.C.

(57) ABSTRACT

Glossy reflections may include areas that are less clear (more blurry) than other regions. For instance, an area of reflection that is closer to the object being reflected may appear clearer than a region that is farther from the object. When generating a glossy reflection, the total amount of light reaching each point on the reflecting surface is calculated according to a spatially-varying convolution kernel of the transparency information for the image being reflected. Ray-tracing, traditionally used to determine a spatially varying convolution, can be very CPU intensive. Instead of using ray-tracing, data structures, such as MIP-maps and summed-area tables, or separable linear filters may be used to compute the spatially-varying convolution. For example, a two-dimensional convolution may be computed as two spatially-varying, separable, linear convolution filters—one computing a horizontal component and the other a vertical component of the final 2D convolution.

23 Claims, 10 Drawing Sheets

U.S. PATENT DOCUMENTS

| | | |
|---|---|---|
| 2004/0032409 A1 | 2/2004 | Girard |
| 2004/0207623 A1 | 10/2004 | Isard et al. |
| 2004/0239672 A1 | 12/2004 | Schmidt |
| 2005/0001834 A1 | 1/2005 | Sugiyama |
| 2005/0206647 A1 | 9/2005 | Xu et al. |
| 2006/0033736 A1 | 2/2006 | Wang |
| 2006/0038822 A1 | 2/2006 | Xu et al. |
| 2007/0257911 A1 | 11/2007 | Bavoil et al. |
| 2009/0033661 A1 | 2/2009 | Miller |

OTHER PUBLICATIONS

Hasenfratz, J, et al, "A Survey of Real-Time Soft Shadows Algorithms," Computer Graphics Forum Blackwell Publishers for Eurographics Aooc UK, vol. 22, No. 4, Dec. 2003.

Heckbert, P.S., et al., "Beam Tracing Polygonal Objects," Compturs and Graphics, Elsevier, GB, vol. 18., No. 3, Jul. 1, 1984.

Crow, F.C., "Summed-area tables for tecture mapping," Computers & Grpahics, UK, vol. 18, No. 3, Jul. 1, 1984.

Catmull E, et al., "3-D Transformations of Images in Scanline Order," Computer Graphics, ACM, US, vol. 14, No. 3, Jul. 1, 1980.

Williams L, "Pyramidal Parametrics," Computer Graphics, ACM, US, vol. 17, No. 3, Jul. 25, 1983.

Laine, S., et al. "Soft Shadow Volumes for Ray Tracing," ACM Transactions on Graphics ACM USA, vol. 24, No. 3, Jul. 3, 2005.

Woo A, et al., "A Survey of Shadow Algorithms," IEEE Computer Graphics and Applications, USA, vol. 10. No. 6, Nov. 6, 1990.

* cited by examiner

SPATIALLY-VARYING CONVOLUTIONS FOR RENDERING GLOSSY REFLECTION EFFECTS

BACKGROUND

1. Field of the Invention

The present invention is directed to computer systems. More particularly, it is directed to graphical image processing including the generation of shadows and reflections.

2. Description of the Related Art

Graphics applications may render simple effects, such as shadows and reflections, that do not lend to the realism of the image. For example, a drop shadow is a visual effect consisting of drawing what appears to be a shadow of an object often giving the impression that the object is raised above the objects behind it. Rendering shadows using point light sources generally results in hard shadows. Hard shadows generally have a distinct edge between deep shade (e.g., the umbra) and no shade. A soft shadow, such as one rendered using an area light source, generally has a soft edge or penumbra, rather than a hard edge. Soft shadow generation in graphic applications generally involves determining the amount of light, and conversely the amount of shadow, that strikes particular points to be shaded. Rendering realistic shadows may improve the overall realism of an image, such as by providing additional spatial indicators about the geometry in the rendered image.

Additionally, soft shadows cast by area light sources and glossy reflections are not uniformly clear. Traditionally, however, shadows in computer generated scenes are generated using techniques, such as using drop shadows and/or point light sources that do not result in realistic appearing shadows. Additionally, blurry shadows are generally generated using a uniform blur or filter algorithm over the rendered shadow. Similarly reflections are traditionally generated using uniform image filters and convolutions function that may not result realistic looking reflections. Techniques to create more realistic drop shadow and/or reflection effects are traditionally very compute intensive. For instance, ray-tracing or ray-casting has traditionally been used to explicitly determine a spatially varying integral. However, ray-tracing can be very CPU intensive and therefore expensive, especially when implemented in software.

SUMMARY

This disclosure describes efficient techniques to compute soft shadows and glossy reflections of planar texture and transparency mapped polygons. These techniques generalize to spatially varying blur as would occur from an area light source—as well as effects involving glossy reflections.

For graphic design and other purposes, it can be appealing to cast reflections from single transparency-mapped surfaces onto other surfaces, especially ground planes or floors. Rendering a graphic scene may, in general, include rendering a reflecting surface, such as a floor plane, while taking into account a reflecting on the floor plane of a foreground reflector image, and then rendering the foreground graphics (including the reflector image) over the top of the rendered floor plane.

In general, glossy reflections may be generated according to various embodiments, as described herein, for use in virtually any sort of graphics or image processing application or system. For instance, in some embodiments, a graphics application, such as an image generation tool, may be configured to generate glossy reflections according to any of various embodiments, as described herein. While in some embodiments, glossy reflections may be generated as part of a larger image processing (or other graphics) application, in some embodiments, glossy reflections may be generated as part of application not directly related to graphics processing. For example, user interfaces are frequently graphical in nature and the use of glossy reflections, according to some embodiments, may be used to enhance the visual appeal, interest or usability of a graphical user interface. In general, glossy reflections may be generated as described herein, as part of virtually any image or graphics rendering process involving planar, transparency-mapped surfaces, according to various embodiments.

In order to generate a glossy reflection, a light (and/or color) value associated with the total amount of light (and/or color) reaching each particular point on a glossy surface, including light and/or color values to be reflected in the surface. According to some embodiments, generating glossy reflections may involve the computation of a spatially-varying integral of the transparency (and/or color) information for the foreground image being reflected for each point or pixel on the reflecting surface.

Thus, according to one embodiment, the size and shape of a spatially varying convolution area may be determined for each of a plurality of pixels within a reflected region of a reflecting plane. The reflected region may correspond to an area of a reflecting plane (e.g., floor) onto which color information from an occluding plane (e.g., an image to be reflected) is reflected.

In some embodiments, the size of the convolution area may vary from pixel to pixel. For instance, the size of the convolution area may vary according to a distance from the occluding plane to the background plane and/or a distance from the pixel to the occluding plane. A pixel closer to the background plane may have a smaller convolution area than another pixel farther from the background plane. Thus, differently sized convolution areas may be used for different pixels, according to some embodiments.

In addition to determining the size and shape of the convolution area for each pixel, a graphics application may also compute a reflection value for each pixel based on color values for the occluding plane within the convolution area, in one embodiment. Thus, when rendering a glossy reflection, a value representing the total amount of light (and/or color) reaching (and possibly reflected) by each particular point (or pixel) on the reflecting surface may be determined and used when determining the final color for the particular pixel. The values computed for the reflection may, according to various embodiments, represent one only variable, factor, or input to additional lighting, color, or graphical/image processing calculations. Additionally, in some embodiments, a scene may include more than one reflecting image and each one may cast a separate reflection. In such a situation, separate respective reflection values may be generated for each reflecting image and combined into a single reflection value for each pixel on the reflecting surface.

Figure 1A:
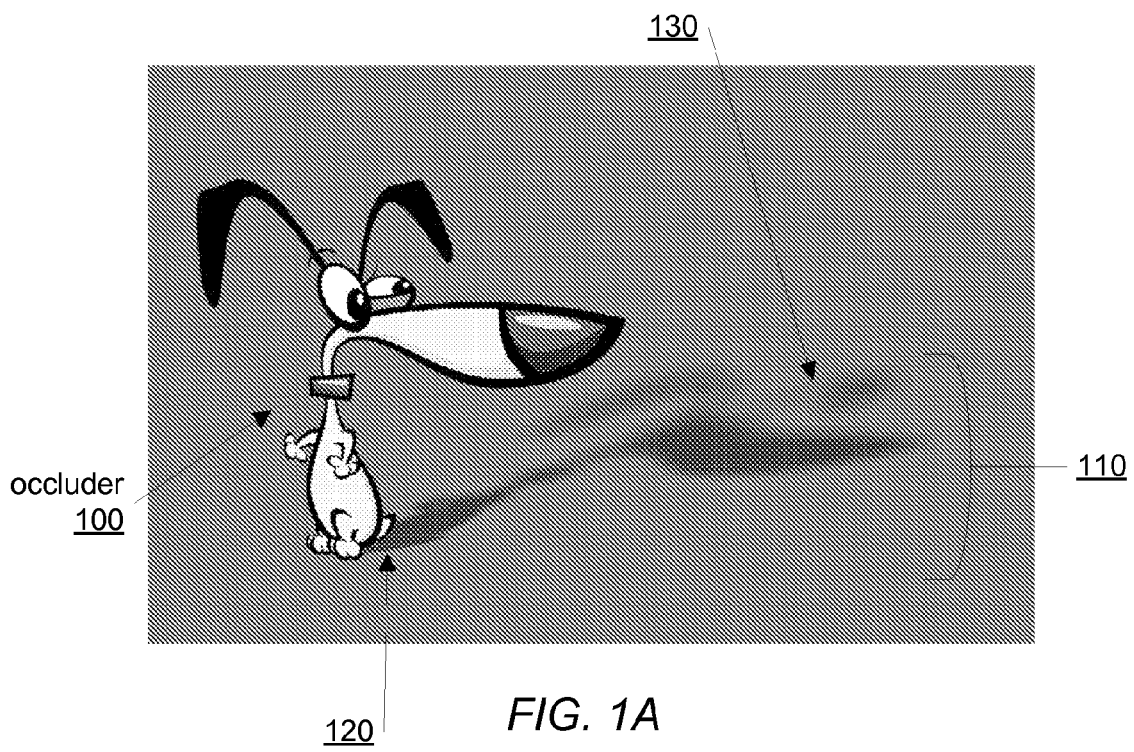
FIG. 1A illustrates an image including a shadow soft floor shadow cast by an area light source from a texture-mapped planar surface, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As noted above, efficient techniques to compute soft shadows and glossy reflections of planar texture and transparency mapped polygons (such as the use of image pyramids and spatially-varying separable filters) can be used for advanced 2.5D or 3D graphical effects. According to one embodiment, these techniques generalize to spatially varying blur as would occur from an area light source—as well as glossy reflections.

For graphic design and other purposes, it may be required or appealing to cast shadows from single transparency-mapped surfaces onto other surfaces, especially ground planes or floors. In general, three objects are required for a shadow to be cast: a light source, a shadow caster and a shadow acceptor. A shadow caster or occluder may represent a plane (or, in some embodiments, an object) that occludes light from reaching a surface (or another plane) and therefore casts a shadow. A shadow acceptor or receiver may represent a plane that is shadowed by one or more shadow casters. While the techniques described herein may be used with image information representing objects of generally any shape, the embodiments and examples described herein utilize image information representing planar image data. Thus, while in some embodiments, an occluder may represent a 3D object of varying shape, in other embodiments described herein, an occluder may represent a two-dimensional plane of graphics information. As described herein, shadows may be generated from planar images. The planar images may have transparency (or alpha) information associated with them. Such transparency information may allow a particular opaque region of the planar image to cast a shadow while other, transparent, regions of the planar image may not. Thus, only part of the planar image may cast a shadow. Such shadows are of images within the planar image, not just a rectangular image of the planar image.

Rather than performing CPU expensive ray-tracing (or ray-casting) to explicitly determine a spatially varying integral of the transparency (and/or color) information for the occluder when computing soft shadows (and/or glossy reflections), in some embodiments, data structures, such as MIP-maps or summed-area tables, may be used to determine (or, in some embodiments, approximate) the computation of a spatially varying integral of the transparency (and/or color) information for the occluder. Similarly, such data structures (MIP-maps, summed-area tables, etc) may be used to determine (or, in some embodiments, approximate) the computation of a spatially varying integral of the transparency (and/or color) information for an image being reflected.

While explicitly determining the integral may produce higher quality results, it can be extremely CPU intensive. Thus, in some embodiments, a convolution representing a spatially varying integral of the transparency (and/or color) information for the occluder may be computed using any of various acceleration (or approximation) techniques, as described herein. For instance, in one embodiment, such a convolution may be computed as two spatially-varying separable convolutions. For example, a two-dimensional convolution may be computed as two spatially-varying, separable, linear convolution filters—one computing a horizontal component and the other a vertical component of the final 2D convolution.

Thus, in some embodiments, a 2D convolution may be split into two parts, a horizontal pass and a vertical pass. For example, a horizontal linear convolution may be applied to image or color information to obtain intermediate values to which a vertical linear convolution may be applied to obtain the result of the 2D convolution, according to one embodiment. In general, the order in which the separate passes of the 2D convolution are applied may vary from embodiment to embodiment. For instance, in another example, a vertical convolution may be applied first and a horizontal convolution may be applied to intermediate values resulting from the vertical pass. In yet other embodiments, other actions, convolutions, functions, or equations may be performed after the first pass of a separable convolution but before the second pass. For example, other horizontal linear functions or convolutions may be applied to the intermediate results before applying the vertical linear convolution.

Computing a 2D convolution using two separable, linear convolutions may allow for more efficient convolution computations than when using more CPU expensive explicit methods, as mentioned above. Additionally, when using two, separable linear convolutions, linear sum tables may be used in the computations, according to some embodiments. Such a technique may maintain the quality (or be of similar quality) of explicit convolutions but may reduce the cost, especially for large convolution kernels. In some embodiments, generating soft shadows may involve a constant time solution that may be comparable in cost to an efficient approximation of a spatially invariant Gaussian convolution.

Algorithms for computing soft shadows and glossy reflections may, in some embodiments, include the computation of a spatially varying integral of the occluder's transparency map (or of the image/object being reflected) for each pixel on the receiving surface. This may be done explicitly or by using acceleration data-structures, such as MIP-maps or summed-area tables. The explicit method gives the highest quality results but may be expensive, such as in terms of execution time. In one embodiment, the convolution may be computed as two spatially-varying separable convolutions. Such a technique may keep the quality of explicit convolutions but may also reduce the cost, especially for large kernels. In another embodiment, generating soft shadows may involve a constant time solution that may be comparable in cost to an efficient approximate spatially invariant Gaussian convolution.

Soft Shadows:

For graphic design and other purposes, it can be appealing to cast shadows from single transparency-mapped surfaces onto other surfaces, especially ground planes or floors. For example, FIG. 1A illustrates a soft shadow cast by an area light onto a floor surface from a texture-mapped planar surface, according to one embodiment. FIG. 1A includes an occluder 100, namely the planar graphic image of a dog, drawn to be viewed in the plane of the display screen. The rendering algorithm for the scenes illustrated in FIGS. 1A and 1B may be expressed in front to back order as first rendering the floor plane taking into account the shadowing of (or reflecting in) the floor by the foreground occluder 100 (i.e. the image of the dog) and then rendering the foreground graphic (including occluder 100) over the top of the rendered floor.

Soft shadows may include areas or regions in which the light is only partially hidden from the shadow acceptor and that are therefore less clear (more blurry) than other regions. For instance, as illustrated in FIG. 1A, the region of shadow 110 indicated by pointer 120 may be closer to the occluder 110 and therefore clearer than the region indicated by 130. The region 130 of shadow 110 is further from occluder 110 than region 120 and therefore is less clear. In some embodiments, region 130 may be used to represent a region of shadow 110 from which the light source is only partially hidden by occluder 100.

As noted above, the generation of soft shadows may, in some embodiments, include the computation of a value representing the total amount of light (and/or color) reaching a particular point on the receiving surface. In some embodiments, a spatially varying integral may be computed to represent the total amount of light (and/or color) reaching each pixel on the receiving surface.

Computing the shadow from the occluder onto the floor plane may include the use of a 3D model of the scene to guide the shadow generation. The occluder in FIGS. 1A and 1B (discussed below) may be considered to be texture mapped onto a vertical plane. That is the foreground image of the dog is represented by a single planar data structure of image information.

Figure 1B:
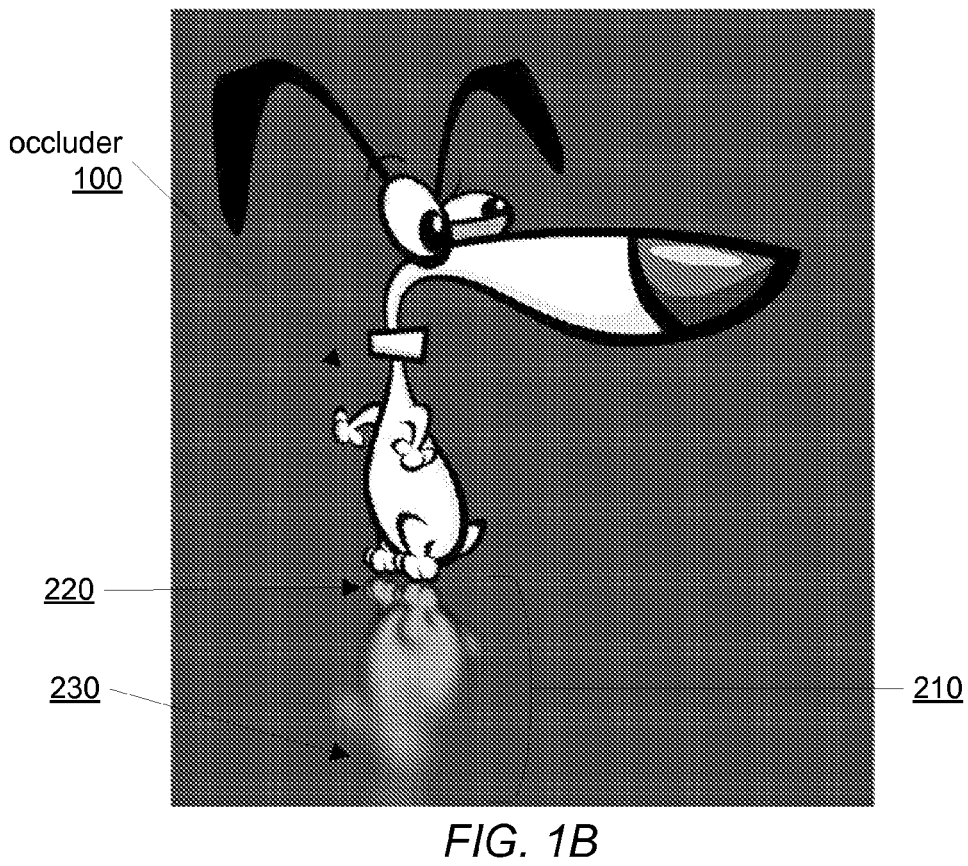
FIG. 1B is a block diagram logically illustrating one embodiment of the geometry of a scene including a glossy reflection rendered as described herein.

While displayed in FIGS. 1A and 1B as parallel to the front of the screen, in some embodiments a foreground image, such as occluder 100, may be oriented in other manners not parallel to the screen. A rotated foreground plane may pass through a line between the two lower paws of the dog to make the shadow cast by the occluder appear like a closer approximation to the correct shadow of a corresponding 3D object. In general, the shadow cast by an image of one view of a 3D shape will only approximate the shadow cast by the 3D shape itself. If the 3D shape is truly planar, the shadow can be computed exactly).

To compute the amount of light reaching a point on the floor requires integrating over a cone of rays towards an area light source. The resulting shadow will have a degree of blur that depends on the distance the rays travel from the floor to the occluder's plane.

The light source is considered to have a spatial distribution, which may be used to weight the amount of light arriving along each ray direction. Each ray may be modulated by the occluder's transparency value at each ray-plane intersection point. The computation may be performed explicitly using ray tracing, in which a large number of rays are fired for each cone and the light summed over each ray.

Figure 2:
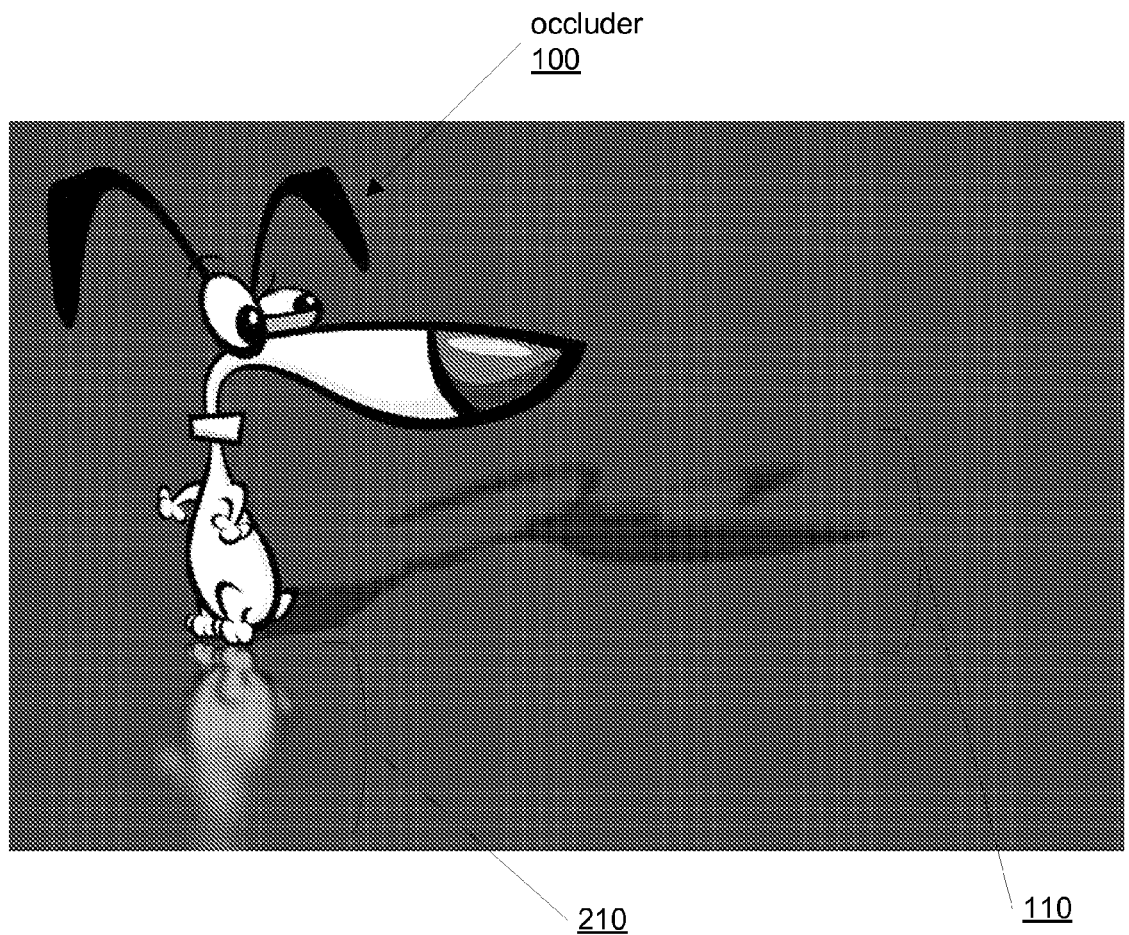
FIG. 2 illustrates an image including both soft shadow and a glossy reflection rendered as described herein, according to one embodiment.

While FIG. 1A illustrates an image with a soft shadow and FIG. 1B illustrates an image with a glossy reflection, in some embodiments, both shadows and glossy reflections may be generated in a single image. For example, FIG. 2 illustrates an image that includes both a soft shadow 110 and a glossy reflection 210 of the same occluder 100 (e.g., the image of the dog). While some embodiments may be configured to generate either soft shadows or glossy reflections, other embodiments may be configured to generate both soft shadows and glossy reflections, either separately or in a single image.

Figure 3A:
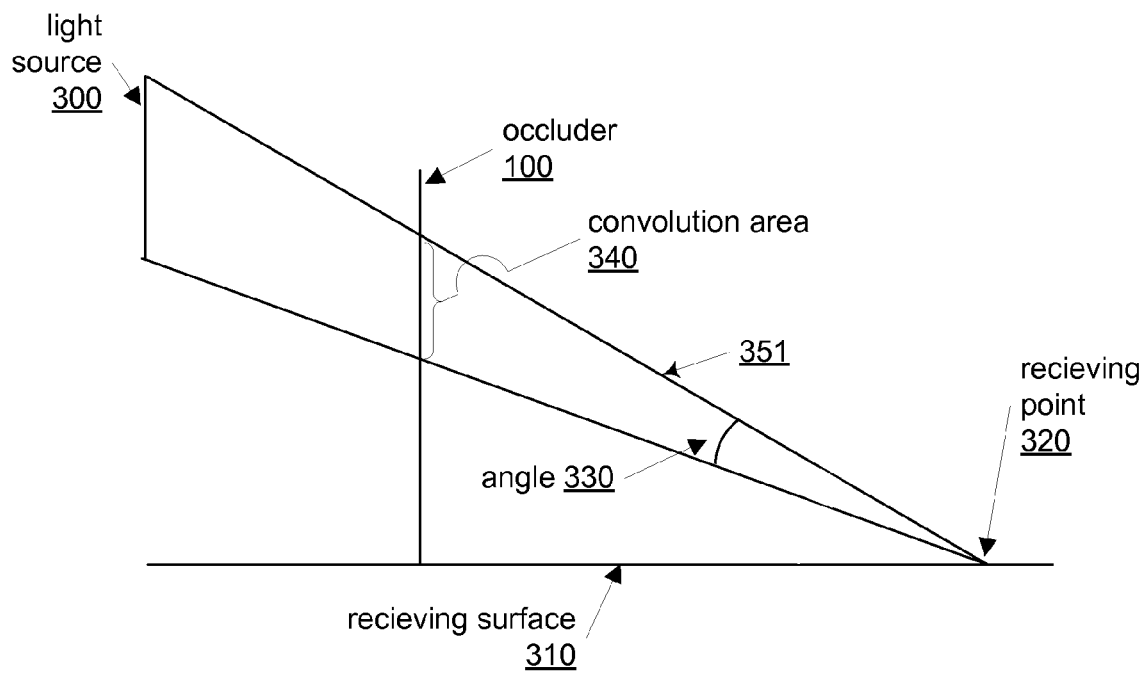
FIG. 3A is a block diagram logically illustrating one embodiment of the geometry of a scene including a soft shadow rendered as described herein.

FIG. 3A is a block diagram logically illustrating one embodiment of the geometry of a scene including at least one soft shadow rendered as described herein. The geometry illustrated in FIG. 3A is shown in cross section. A planar light source 300 may be parallel to the plane of occluder 100 in some embodiments, as illustrated in FIG. 3A. In other embodiments, a light source may not be parallel to occluder 100. Light source 300 may illuminate a receiving point 320 over a solid angle (cone) 330. Each ray or ray projection within angle 330 may be modulated by a transparency (or attenuation) value associated with a location where that particular ray hits the occluding plane (of occluder 100). The size of the ray projection or convolution area, which, in some embodiments, may be a cone of rays, may vary according to specific scene geometry (e.g., the size of the light source, the distance from the light source to the receiving point, etc). Thus, the size of convolution area 340 may vary according to the distance between the receiving pixel and the light source and according to a size and/or shape of the light source. The amount of light reaching the receiving point may be computed as the convolution of the transparency values in the occluding plane 100 modulated by a normalized brightness distribution of the light source 300, according to some embodiments. In other embodiments, a value corresponding to the amount of light reaching a particular receiving point may be computed in other ways. The resulting computed value may be used to modulate the amount of light that would reach the receiving point 320 from light source 300 unoccluded by occluder 100. Thus, in some embodiments, generating a soft shadow, such as for image geometries in which the light source 300 is parallel to the plane of occluder 100, may only require the efficient computation of the convolution in the occluder plane for each receiver cone of illumination.

As noted above, the convolution used to computer the amount of modulated light (and/or color) reaching a particular receiving point 320 may be computed using an explicit convolution. However, the cost of explicit convolution computation generally increases quadradically with the cone angle (e.g., angle 220), which is generally related to the size of the light source 300. More efficient schemes may be used for special cases of the light distribution function (the intensity over the light source). While described in terms of a cone, in general, solid angle 330 may not represent a spherical cone. Instead, in some embodiments, light source 300 may be rectangular and therefore the light reaching receiving point 320 may be computed using a corresponding rectangular convolution. In general, the shape of the ray projection may describe a convolution may be any of various shapes depending upon the size and position of the light source 300 in relation to both occluder 100 and receiving point 320, according to various embodiments. For example, while illustrated as being completely within the vertical space of occluder 100 in FIG. 3A, in some embodiments, convolution area 340 may extend beyond the bounds of occluder 100, as illustrated in FIG. 3B.

Figure 3B:
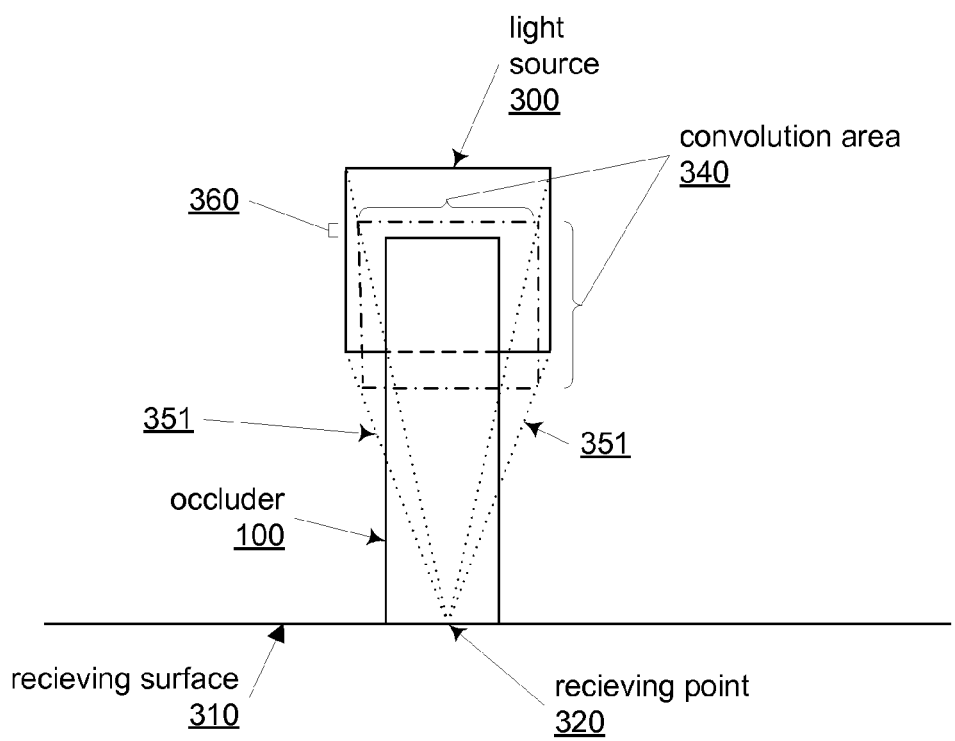
FIG. 3B is a diagram logically illustrating a frontal elevation view of one embodiment of the geometry of a scene including a soft shadow rendered as described herein.

FIG. 3B is a diagram logically illustrating a frontal elevation view of one embodiment of the geometry of a scene including a soft shadow rendered as described herein. As illustrated in FIG. 3B, convolution area 340 extends above the top of occluder 100, as indicated by gap 360. Similarly, convolution area 340 may extend beyond the sides of occluder 100, as also illustrated in FIG. 3B. Additionally, FIG. 3B represents a single illustrative example of a convolution for a single receiving pixel 320. Within the same image scene, other pixels of receiving surface 310 may have other convolution areas of differing sizes.

Figure 3C:
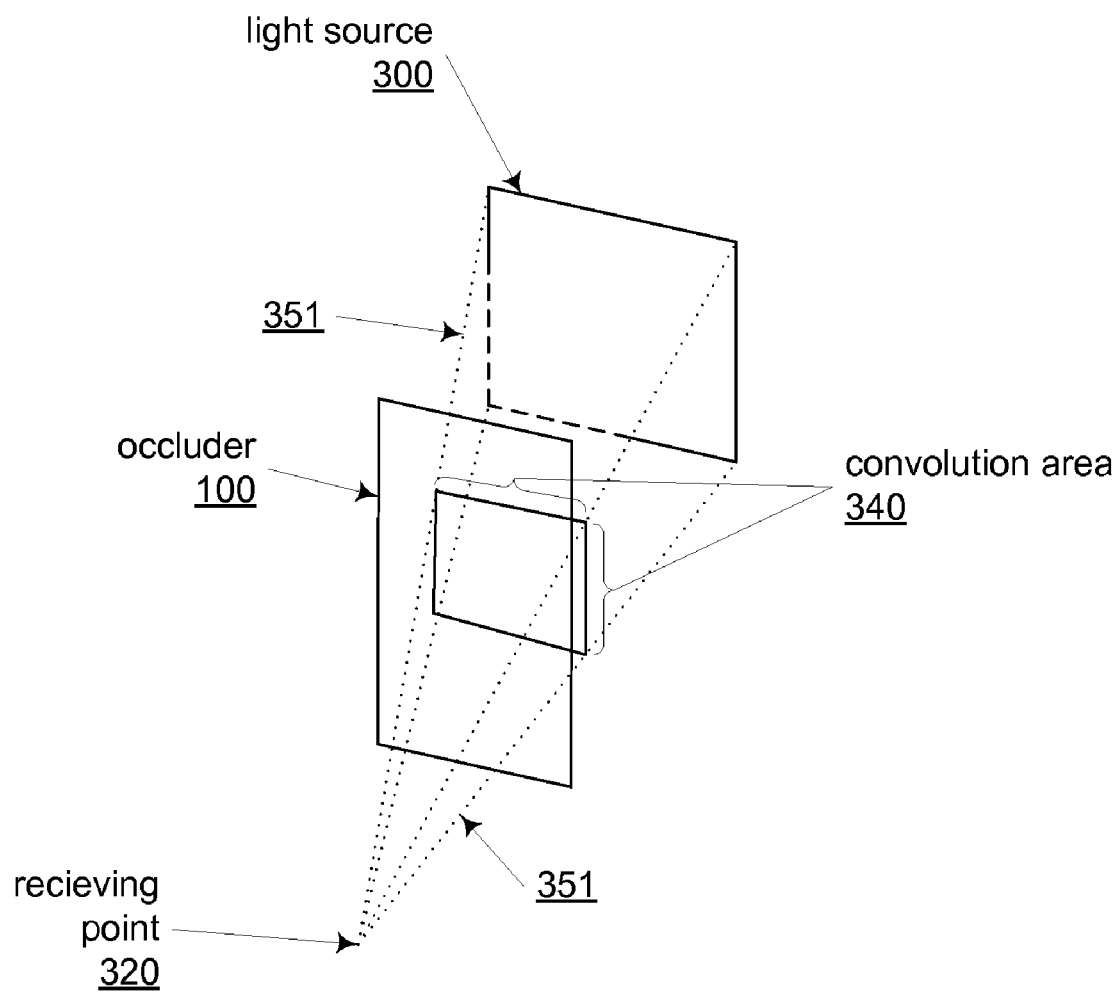
FIG. 3C is a diagram logically illustrating an isometric view of one embodiment of the geometry of a scene including a soft shadow rendered as described herein.

FIG. 3C is a diagram logically illustrating a perspective view of one embodiment of the geometry of a scene including a soft shadow rendered as described herein. Convolution area 340 is illustrated extending over the right edge of occluder 100, but not reaching or extending beyond any of the other edges of occluder 100. When determining or computing a shadow or light attenuation value for receiving point 320, a no-attenuation value may be used for those portions of convolution area 340 that extend beyond the edges of occluder 100 or for any fully transparent areas of occluder 100. Thus, when computing a shadow or attenuation value for receiving point 320, attenuation values for occluder 100 may be used for that portion of convolution area 340 overlapping occluder 100 while no-attenuation values for occluder 100 may be used for that portion of convolution area that extends beyond the edges of occluder 100.

As noted above, the size and/or shape of convolution area 340 may vary spatially from receiving point to receiving point. For example, as illustrated in FIG. 3C, the size of convolution area 340 may depend on the size, shape and location of light source 300. In other words, convolution area 340 may be represented as a rectangle because light source 300 is a rectangle. If light source 300 were represented as a circle, convolution area 340 may be represented as a circle, or as an ellipse in some embodiments. If the light source is represented as a circle, the shape of convolution area 340 may vary according to the distance receiving point 340 is from a line perpendicular to the plane of light source 300. The further a pixel is from such a perpendicular line, the angle between the receiving point and the plane of the light source may become more oblique and therefore convolution area 340 may be more elliptical.

Similarly, the size of convolution area 340 may also depend on the size of light source 300 and the location of the occluder 100 between receiving point 320 and light source 300. For instance, if the distance between occluder 100 and light source 300 were smaller, the size of convolution area 340 would increase, according to some embodiments, since the angle between the upper and lower edges of convolution area 340 may increase (as seen from receiving point 320). If the light source were farther away from occluder 100, the size of convolution area 340 would decrease. If light source were higher or lower than illustrated in FIG. 3C, the size and shape of convolution area 340 may increase or decrease accordingly.

Figure 4:
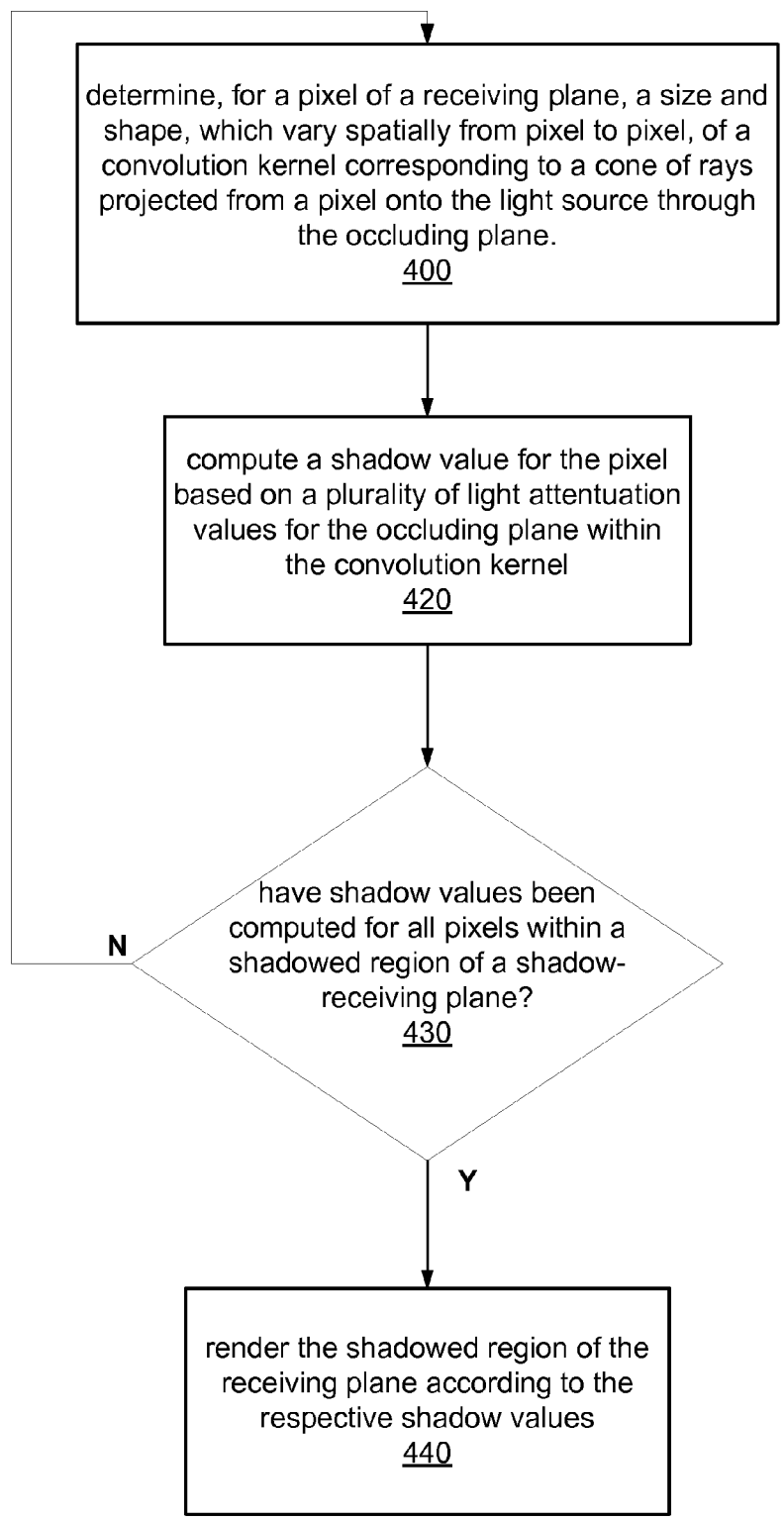
FIG. 4 is a flowchart illustrating one embodiment of a method for generating soft shadow, as described herein.

FIG. 4 is a flowchart illustrating one embodiment of a method for generating a soft shadow as described herein. Such a method may be implemented as part of a graphic application either in software on a CPU, on a GPU or as a combination of both. As noted above, the techniques described herein may be implemented as part of a larger graphics application, such as a drawing program or other image rendering application. Also as noted above, a graphics application may generate a soft shadow as part of generating a larger scene and the image information resulting from generating the soft shadow may not be displayed directly, but may be incorporated into other rendering calculations in order to render the final, complete image.

Additionally, as described above, generating a soft shadow may, in some embodiments, involve computing (or approximating) a spatially-varying convolution filter to the light attenuation or transparency (e.g., alpha) values for the occluder to determine the shadow value for the pixels of the shadow receiving plane. Thus, as indicated by block 400, a graphical application may determine a size and shape of a spatially-varying convolution kernel (or area) corresponding to a cone of rays projected from a respective pixel through the occluding plane onto a light source. The size and shape of the convolution kernel or area may vary from pixel to pixel. For example, as noted above regarding FIGS. 3A, 3B and 3C, the size and shape of a convolution area for one pixel may differ from the size and shape of the convolution area for a different pixel. For example, if the light source is rectangular, the convolution area may be rectangular. Similarly, if the light source is circular, the convolution area may be circular or elliptical, such as depending upon the angle between the pixel and the plane of the light source.

Additionally, as explained above, using a spatially-varying convolution (e.g., the size may vary according to the location of the particular pixel within the shadow) may generate soft shadows in which portions are clearer the nearer they are to the occluder and less clear the further they are from the occluder.

After determining the size and shape of the convolution for the respective pixel, the graphical application may compute a shadow value for the respective pixel based on a plurality of light attenuation values for the occluding plane within the convolution kernel, as illustrated by block 420. For example, as noted above, a graphical application may, in one embodiment, compute an integral of the light attenuation (e.g., transparency or alpha) values within the convolution on the occluding plane. In some embodiments, the application may utilize ray-tracing or ray-casting to explicitly compute the convolution integral. In other embodiments, however, the application may utilize any of various types of acceleration data structures, such as summed-area tables, MIP-maps and linear sum tables, to approximate the convolution integral. In yet other embodiments, the graphical application may perform a two-dimensional convolution filter, such as a two-dimensional box filter either once or repeatedly to approximate the convolution integral.

The graphical application may compute a shadow value for each of a plurality of pixels with a shadowed region of the shadow-receiving plane, as indicated by the negative output of decision block 430. In some embodiments the application may compute shadow values for the entire receiving (e.g., floor) plane. In other embodiments, however, the application may first determine which regions of the receiving plane are in shadow and then only compute shadow values for those regions. Once the application has computed the shadow values for all the pixels with a shadowed region of the shadow receiving plane, as indicated by the positive output of block

430, the application may then render the shadowed region of the receiving plane according to the respective shadow values, as illustrated by block 440.

In some embodiments, occluder 100 may include one or more transparent (at least partially) areas and thus may take into account that different amounts of light (and therefore color) may pass through the occluder onto the receiving plane. The original light color (e.g., from the light source) may be attenuated according to the transparency of the occluder. For example, the original light color may be multiplied by the occluder's transparency (e.g., alpha) value in some embodiments. Additionally, in some embodiments, an occluder may be more like a stained glass window where a different amount of light passes through depending on the color of the occluder at that location. Thus, the light may be attenuated separately for each of the three color values (red, green and blue) of the light and possibly using alpha values corresponding to the three color values. In other words, in some embodiments, an occluder may include alpha-R, alpha-G and alpha-B values that may be used to attenuate the light passing through.

Thus, a soft shadow may be generated to also include color information resulting from the attenuation of light passing through a colored, at least partially transparent, occluder.

In embodiments where the light source 300 is planar and parallel to the occluder, as illustrated in FIG. 3A, the convolution may directly map to the distribution of the light intensity over its surface. In one embodiment, the light source 300 may be rectangular of constant intensity and vertically aligned (parallel to) the occluder 100 and the convolution may be computed using a rectangular filter on the transparency information of the occluder 100. In some embodiments, such transparency information may be stored in a transparency map for occluder 100. Convolutions computing using a rectangular filter may, in some embodiments, be achieved in constant time, such as when the transparency values are stored in a summed area table, thus accelerating the filter computations. Using interpolation in the summed area table may also allow for sub-pixel accurate integrals to be computed independently of size of angle 330, such as with four texture interpolations, according to one embodiment.

In some embodiments, the light source 300 may be described using a non-constant illumination functions or may not be parallel to the plane of occluder 100. In such cases, it may be less accurate to approximate the convolution integral with a rectilinear shape. Additionally, if light source 300 is greatly distant from occluder 100 and receiving point 320, the projection of the light source distribution onto the plane of occluding plane (of occluder 100) may result in a convolution kernel that changes in scale, such as according to the distance between receiving point 320 and occluder 100, but not in shape.

Additionally, in some embodiments, the convolution integral may be approximated using an image pyramid or MIP-map. MIP stands for multum in parvo, which means "much in a small space". A MIP-map may be a data structure configured to store multiple versions of an image, each at a different level of detail. In some embodiments, a graphics application may utilize a MIP-map to store attenuation values for the occluder at different levels of detail. For example, each value at one level of such a MIP-map may represent a summing (or other combination) of a plurality of values from a lower level of the MIP-map. For example, a tri-linear interpolation may be used between levels of a MIP-map, and such computations may be accelerated by modern rendering hardware (such as a graphic processing unit or GPU). Thus, a convolution integral may be approximated using a MIP-map on a GPU, or other graphics hardware, in some embodiments. MIP maps may be used to approximate kernels where interpolating between two scales of a kernel (typically a factor of 2) is a reasonable approximation to the real kernel at an intermediate scale. For instance, a factor of the square-root of two (or other number) may be used to improve the accuracy of MIP-map-based convolution computation—perhaps with an additional cost of generating the MIP-maps.

Box and Gaussian convolutions generally have the property that one level of the MIP-map may be filtered to generate the next. Thus, in some embodiments, the base resolution image may not be required to generate every level of a MIP-map, such as for an arbitrarily light source). In general, this is not true with the base resolution image being required to be filtered to generate each level of the MIP-map.

For light sources that project onto the occluder 100 with a non-square aspect ratio, summed area tables may be used in some embodiments to compute or approximate, the convolution integral. Additionally, if a light source is more Gaussian-like in intensity distribution, the transparency map may be non-proportionally scaled, such as to make the convolution kernel approximately square in the scaled transparency map) and then a MIP-map may be used to compute (or approximate) the spatially varying integral.

In some embodiments, the aspect ratio of the convolution kernel may vary with the height of the light source. For instance, when light source 300 is near (or at least not greatly distant) from occluder 100, the aspect ratio (height to width) of the mapped convolution kernel (such as from the light source onto the transparency map of occluder 100) may vary with the height of light source 300. Thus, in some embodiments, summed area tables may be used to compute (or approximate) the convolution kernel integral for rectilinear light sources.

In other embodiments, however, summed-area tables may not be appropriate. For instance, in one embodiment, an elliptically-weighted averaging filter may be used for light source with light distributions that are Gaussian-like. Elliptically-weighted averaging may, in some embodiments, be approximated using a MIP-map. For example, the minor axis of the ellipse may be used to compute a MIP-map level and the ratio of the major to minor axis may determine the number of samples to take along the major axis of the ellipse. Such a sampling scheme may work, according to some embodiments, for light sources with light distributions approximated by arbitrarily scaled Gaussians.

Glossy Reflections:

As described above, computing soft shadows may involve the computation of a convolution corresponding (at least approximately) to the intersection of a ray projection, such as a cone of rays, from a receiving point on a receiving surface through an occluder to a light source, as described above. Similarly, generating glossy reflections may also involve the intersection of a ray projection with a planar surface.

In general, reflecting surface or plane, such as a glossy floor, may reflect images (e.g., color information) of another plane or image. A foreground image that is reflected in a reflecting plane may represent a plane that occludes color information (e.g., light) from a background plane from reaching the reflecting surface. For instance, and image of lake may reflect the image of the sky in the surface of the water. However, a foreground image, such as a boat on the water will prevent a portion of the water (e.g., the portion reflecting the image of the boat) from reflecting the sky. Thus, a foreground image may be considered an occluder (e.g., occluding part of the background image from the reflecting surface).

While the techniques described herein may be used with image information representing objects of generally any shape, the embodiments and examples described herein utilize image information representing planar image data. Thus, while in some embodiments, an occluder may represent a 3D object of varying shape, in other embodiments described herein, an occluder may represent a two-dimensional plane of graphics information. As described herein, reflections may be generated from planar images.

Additionally, the planar images may have transparency (or alpha) information associated with them. Such transparency information may also allow a particular region of the planar image to allow some of the background image to be visible through the occluder and therefore to be reflected (at least some).

For example, FIG. 1B illustrates an image including a glossy reflection 210 cast onto a reflecting surface from a texture-mapped planar surface (e.g., occluder 100), according to one embodiment. FIG. 1B includes occluder 100 (e.g., the graphic image of a dog) rendered in the plane of the display screen and a glossy reflection 210. In FIG. 1B, the foreground image of the dog is referred to as an occluder, because it occludes part of the background that may otherwise be reflected in the reflecting surface (e.g., the floor in FIG. 1A). In general when rendering a reflecting surface, such as the floor or ground plane of FIG. 1B, the background image is reflected in the floor except where a foreground object, such as occluder 100, blocks a portion of the background image from being reflected. Thus, while reflection 210 appears to be the only a reflection of occluder 100, in some embodiments, reflection 210 may only represent that portion of a larger reflection. For example, the general (or background) color illustrated in FIG. 1B may itself represent a reflected image, such as of the sky, and thus, reflection 210 may be considered that portion of the larger reflection that corresponds to occluder 100. Thus, while described herein main in reference to generated a reflection of an foreground object or image, in general, the techniques for rendering glossy reflections described herein may be applied to generating a reflection of an entire scene (e.g., including a reflection of the background and any foreground images.

In general, when rendering a graphic scene, such as the one illustrated in FIG. 1A, may be expressed in front to back order as first rendering the floor plane taking into account the reflection on the floor of occluder 100 and then rendering the foreground graphics (including occluder 100) over the top of the rendered floor.

Glossy reflections may include areas or regions that are less clear (more blurry) than other regions. In general, portions of a reflection that are closer to the object being reflected will be less blurry and thus clearer than portions further away from the object being reflected. For instance, as illustrated in FIG. 1B, the region of shadow 110 indicated by pointer 220 may be closer to the foreground image 200 and therefore may be clearer than the region indicated by 230, which is further away from foreground image 200. The region 230 of reflection 210 is further from foreground image 200 than region 220 and therefore may be less clear. In general, a portion or region of a reflection is referred to as being "closer to" or "further from" an object being reflected, with regards to the logical geometry of the scene construction, as will be discussed in more detail below, and does not necessarily reflect the positions of the various regions in a final, rendered, 2D image.

In general, glossy reflections may be generated according to various embodiments, as described herein, for use in virtually any sort of graphics or image processing application or system. For instance, in some embodiments, a graphics application, such as an image generation tool, may be configured to generate glossy reflections according to any of various embodiments, as described herein. While in some embodiments, glossy reflections may be generated as part of a larger image processing (or other graphics) application, in some embodiments, glossy reflections may be generated as part of application not directly related to graphics processing. For example, user interfaces are frequently graphical in nature and the use of glossy reflections, according to some embodiments, may be used to enhance the visual appeal, interest or usability of a graphical user interface. In general, glossy reflections may be generated as described herein, as part of virtually any image or graphics rendering process involving planar, transparency-mapped surfaces, according to various embodiments.

In order to generate a glossy reflection, a light (and/or color) value associated with the total amount of light (and/or color) reaching each particular point on a glossy surface, including light and/or color values to be reflected in the surface. According to some embodiments, generating glossy reflections may involve the computation of a spatially-varying integral of the transparency (and/or color) information for the foreground image being reflected for each point or pixel on the reflecting surface.

Thus, when rendering a glossy reflection, a value representing the total amount of light (and/or color) reaching each particular point (or pixel) on the receiving surface is determined and used when determining the final color for the particular pixel. Thus the values computed according to any of various embodiments for the glossy reflection may only represent one factor (or input) into additional lighting, color, or graphical/image processing calculations.

As noted above, the generation of glossy reflections may, in some embodiments, include the computation of a value representing the total amount of light (and/or color) reaching a particular point on the reflecting surface. In some embodiments, a spatially varying integral may be computed to represent the total amount of light (and/or color) reaching each pixel on the receiving surface. Traditionally, ray-tracing or ray-casting has been used to explicitly determine a spatially varying integral. However, ray-tracing can be very CPU intensive and therefore expensive, especially when implemented in software. Instead of using ray-tracing, the problems are recast as convolutions that are then solved efficiently for different special cases.

Figure 5:
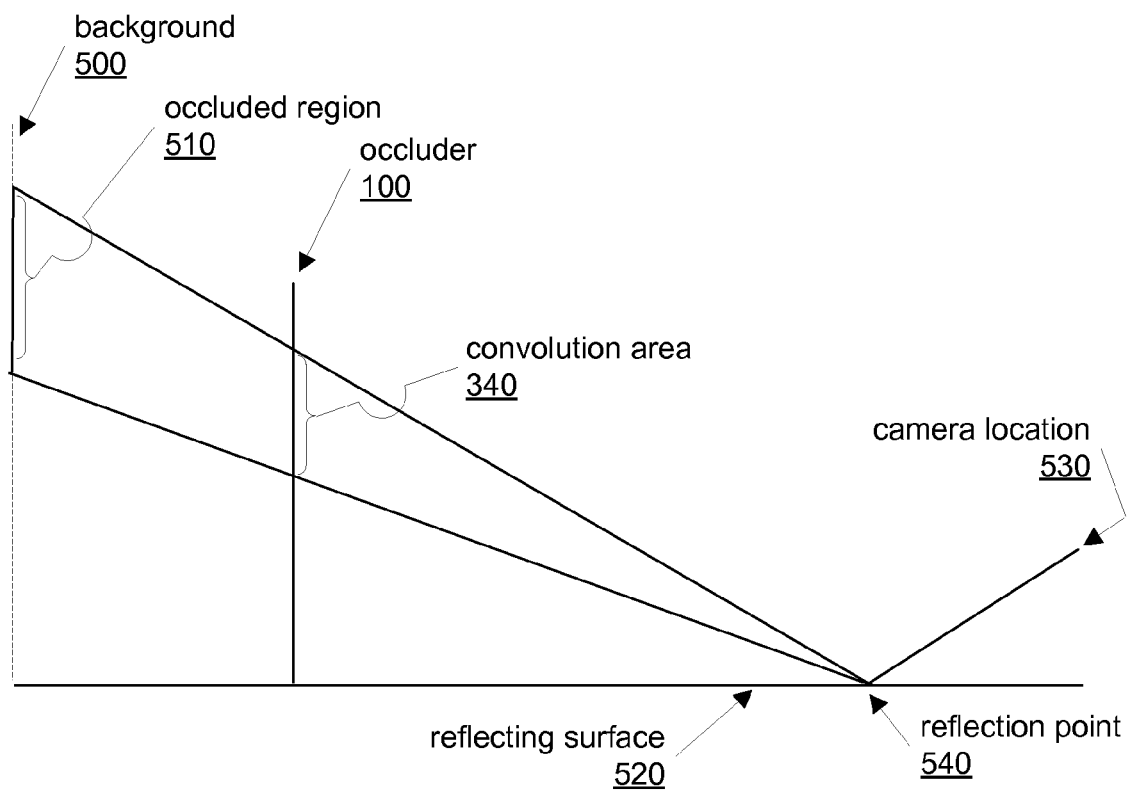
FIG. 5 is a block diagram logically illustrating one embodiment of the geometry of a scene including a glossy reflection rendered as described herein.

FIG. 5 logically illustrates an image including a glossy reflection of occluder 100 cast onto a reflecting surface 520. As noted above, a foreground image being reflected in reflecting surface 520 may be referred to as an occluder since it may block part of the background from being reflected. For instance, as illustrated in FIG. 4, occluder 100 may block occluded region 510 from being reflected at reflection point 540. As with FIG. 3A, described above, in FIG. 5, occluder 100 is illustrated as a screen-aligned vertical plane, according to some embodiments.

When rendering glossy reflections, the reflecting surface 520 may be considered less than perfectly smooth. Reflections on a less than perfectly smooth surface may be considered blurry and the relative amount of blur may increase linearly, in some embodiments, with the distance between the reflection point 540 and the corresponding intersection point on foreground image 200 (i.e., the plane of foreground image 200).

FIG. 5 illustrates the geometry of cone of rays reflected from reflection point 540 to occluder 100. In reality, physical light would be reflected up from reflection point 540 to camera (or the viewer's eye) location, such as camera location 530, when generating glossy reflections in a graphic image, a cone of light may be referred to as reflected from reflection point 540 to occluder 100, such as when determining the size and location of convolution area 540. Thus, it is non-physical but intuitive to consider a ray traveling from the eye (or camera location 530), being reflected and also randomly deflected by reflecting surface 520. The ray then intersects the foreground object (occluder 100), which has a color and a transparency value. A color value for reflection point 540 may then be computed based on the color and/or transparency values within the convolution area 540 for the occluder 100. The color value determined for reflection point 540 may then be combined with other color terms or values for reflection point 540, such as a shadow value, discussed above regarding generating soft shadows.

As illustrated in FIGS. 3A, 3B and 3C and described above regarding shadow generation, the size and shape of convolution area 340 may vary from reflection point to reflection point when generation glossy reflections. The size and shape of convolution area 340 may vary depending upon the specific geometry of the scene being rendered. For example, the size and shape of convolution area 340 may depend on the location of reflection point 540 relative to both background 500 and occluder 100. While not directly involving a light source, a glossy reflection may be rendered as described herein using some of same techniques described above regarding shadow generation. For example, in some embodiments, the size and shape of convolution area 340 for reflection point 540 may be determined according to an imaginary light source, corresponding to occluded region 510, located within the place of background 500. Thus, the size and shape of this imaginary light source may be used to determine the size and shape of convolution area 340 in the same, or a similar, manner as that described above regarding soft shadow generation.

In some embodiments occluder 100 may be opaque and therefore no light or color information from background 400 within occluded region 510 may reach reflection point 540. Thus, in some embodiments, only the color and/or transparency values of occluder 110 (within convolution area 540) may be used when determining a reflected color value for reflection point 540. In other embodiments, however, occluder 100 may be at least partially transparent and therefore may allow some color from within occluded region 510 of background 500 to reach reflection point 540. Thus in some embodiments, the reflection color computed for reflection point 540 may be the foreground image color (from the convolution are 540 of occluder 100) composited (or otherwise combined) with the background color, such as by using a corresponding transparency value for the occluder. The color value may be computed, in some embodiments, for each of a set of rays reaching reflection point 540.

Additionally, in some embodiments, each of the rays may be deflected differently by the reflecting surface at reflection point 540. For example, depending on the specific geometry of reflecting surface 520 at reflection point 540, a ray from one location of convolution area 540 may be deflected different by reflection point 540 than a ray from another location in convolution area 540. In some embodiments, the total reflected color value may also be a weighted sum of each, individual, ray color.

In some embodiments, the background color may be constant and therefore a convolution kernel of the foreground color (of occluder 100) may be composited over the background color using a single transparency (e.g., alpha) value. The single transparency value may be computed using the same convolution kernel, such as convolution area 540, of the occluder 100. The convolution integral may then be computed (or approximated) using the same techniques described above regarding soft shadows. For example, in some embodiments, the convolution integral may be computed explicitly using ray-tracing. However, in other embodiments, summed area tables, MIP-maps and multiple (two) separable linear convolutions may be used when computing (or approximating) a reflection value for a particular reflection point 540.

As described above regarding FIGS. 3A, 3B and 3C, convolution area 340 may not be fully contained within the edges of occluder 100. For example, as illustrated in FIG. 3B, described above regarding the generation of soft shadows, convolution area 340 may extend beyond one (or more) of the edges of occluder 100. Similarly, when generating glossy reflection, convolution area 340 may extend beyond the edge(s) of occluder 100 and therefore within convolution area 340 some portion(s) may be affected by color or transparency values of occluder 100 while other portions may not. Thus, for those portions of convolution area 340 that extend beyond occluder 100, the background color may be used without using color or transparency values for occluder 100.

For glossy reflections, the ray-distribution function is frequently Gaussian-like and thus in some embodiments, MIP-map-based approximations may result in more convincing results (in terms of efficient generation of, and realistic look of, glossy reflections) than summed area tables. However, other embodiments may utilize MIP-map-based approximations and still other embodiments may utilize summed area tables when computing (or approximating) a reflection value for a convolution kernel. In yet other embodiments, any of various convolution computation or approximation techniques, such as MIP-maps or summed area tables may be used depending on the specific geometry and/or other aspects of the image or scene being rendered.

As noted above, glossy reflections may be clearer close to the object being reflected, such as occluder 100, and may be more blurry farther away from the object being reflected. Thus, generating both soft shadows and glossy reflections may, in some embodiments, involve spatially varying convolutions. Additionally, as described above, in some embodiments, a 2D convolution may be computed using two, separable, linear convolution filters.

Thus, when rendering a glossy reflection, a value representing the total amount of light (and/or color) reaching each particular point (or pixel) on the receiving surface is determined and used when determining the final color for the particular pixel. Thus the values computed according to any of various embodiments for the glossy reflection may only represent one factor (or input) into additional lighting, color, or graphical/image processing calculations.

For instance, when rendering either a soft shadow or a glossy reflection, the resultant image information may be warped in order to have the shadow or reflection better appear to be connected to the occluder. Thus, warping of shadows and reflections to visually match occluder image may be performed in various embodiments. This may be desired due to the occluder being a 2D image of a 3D object rather than an actual 3D object. Referring again to FIG. 2, since the image of the dog on occluder 100 is planar image data and may not include any actual 3D information, a shadow cast by occluder 100 may not actually meet up with the feet of the dog in the image. In other word, since the dog is represented by varying colors in the occluder, there may not by any 3D geometric model that can specify where the dogs, feet actually are. Additionally, as illustrated in FIG. 2, an occluder image may illustrate a 3D perspective that doesn't actually exist in the rendered image. For example, in FIG. 2, the lower paws (e.g., the feet) of the dog are illustrated with perspective. The dog's left foot is drawn lower on the image that its right foot, thereby making it appear as if the dog's left foot is in front of the other.

Thus, in some embodiments, soft shadows and glossy reflections may be warped to ensure that the correct edge of the shadow or reflection appears to be correctly positioned in relation to the occluder. For instance, reflection 210 has been warped so that the reflection of the dog's right foot touches the occluding right foot. In some embodiments, various types of image warping functions may be applied either during or after generating soft shadows and/or glossy reflections.

Figure 6:
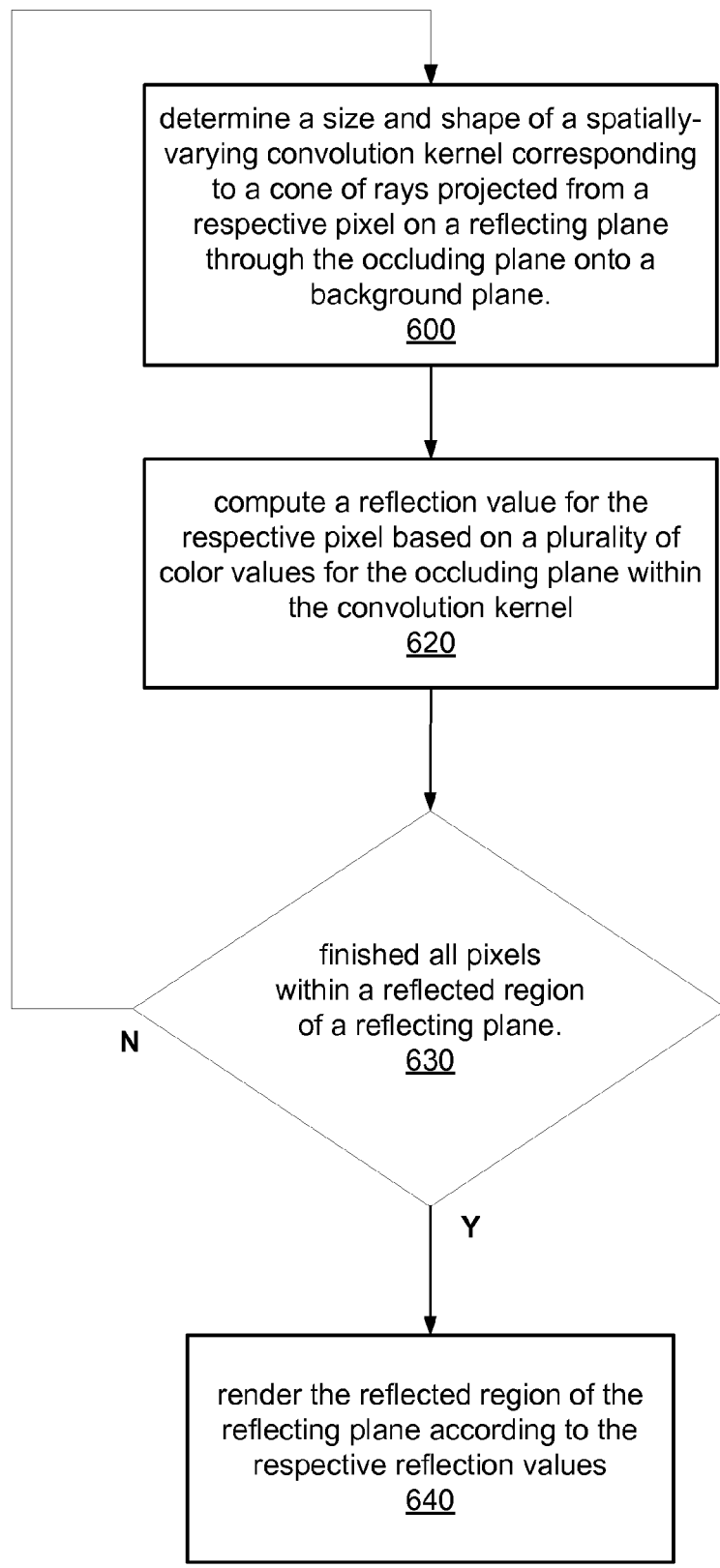
FIG. 6 is a flowchart illustrating one embodiment of a method for generating glossy reflection, as described herein.

FIG. 6 is a flowchart illustrating one embodiment of a method for generating a glossy reflection as described herein. Such a method may be implemented as part of a graphic application either in software on a CPU, on a GPU or as a combination of both. As noted above, the techniques described herein may be implemented as part of a larger graphics application, such as a drawing program or other image rendering application. Also as noted above, a graphics application may generate a glossy reflection as part of generating a larger scene and the image information resulting from generating the reflection may not be displayed directly, but may be incorporated into other rendering calculations in order to render the final, complete image.

Additionally, as described above, generating a glossy reflection may, in some embodiments, involve computing (or approximating) a spatially-varying convolution filter to the color information values for the occluder to determine reflective values for the pixels of the reflecting surface. Thus, as indicated by block 400, a graphical application may determine a size and shape of a spatially-varying convolution kernel (or area) corresponding to a cone of rays projected from a respective pixel of a reflecting surface through the occluding plane onto a background plane. As explained above, by using a spatially-varying convolution (e.g., the size may vary according to the location of the particular pixel within the shadow) may generate glossy reflections which are clearer the nearer they are to the occluder.

After determining the size and shape of the convolution for the respective pixel, the graphical application may compute a reflective value for the respective pixel based on a plurality of color values for the occluding plane within the convolution kernel, as illustrated by block 620. For example, as noted above, a graphical application may, in one embodiment, compute an integral of the color values within the convolution on the occluding plane. In some embodiments, the application may utilize ray-tracing or ray-casting to explicitly compute the convolution integral. In other embodiments, however, the application may utilize any of various types of acceleration data structures, such as summed-area tables, MIP-maps and linear sum tables, to approximate the convolution integral. In yet other embodiments, the graphical application may perform a two-dimensional convolution filter, such as a two-dimensional box filter either once or repeatedly to approximate the convolution integral.

The graphical application may compute a reflection value for each of a plurality of pixels with a reflected region of the reflecting surface, as indicated by the negative output of decision block 630. In some embodiments the application may compute reflection values for the entire reflecting surface. In other embodiments, however, the application may first determine which regions of the reflecting plane are reflecting images (other than perhaps a uniform background reflection color) and then only compute reflection values for those regions. Once the application has computed the reflection values for all the pixels with a reflected region of the reflecting plane, as indicated by the positive output of block 630, the application may then render the reflected region of the receiving plane, which in some embodiments may represent the entire reflecting plane, according to the respective reflection values, as illustrated by block 640.

Separable Spatially Varying Convolutions:

Separable filters may be considered those filters that can be expressed as two convolutions in orthogonal directions. Examples include box filters and Gaussian convolutions. While the MIP-map-based techniques may give reasonable results for glossy reflections in some embodiments, there may still be some approximations based on the scale-steps between MIP levels. In some embodiments, an explicit convolution may be preformed, but, as noted above, this may lead to quadratic computational cost. Thus, in some embodiments, a convolution may be expressed as two separable passes—one horizontal and one vertical.

In the case of glossy reflection generation, as described herein and illustrated in FIGS. 1 and 2, the convolution size may be constant horizontally and may vary linearly with height (up plane of occluder 100). In other words, since, in some embodiments, the plane of occluder 100 may be parallel to the plane of the rendered image, the convolution size may be constant across the horizontal plane of the displayed image and may vary across the vertical plane of the displayed image.

Thus, in some embodiments, the horizontal convolution filter may be computed with a constant kernel being applied with a different kernel size at each horizontal line of the convolution kernel. In general, a horizontal line of the convolution kernel may correspond to one row of color (and/or transparency) information for occluder 100. The convolution kernel may be computed as either a directly Gaussian convolution or as a Gaussian-approximation based on successive box filters (which may have constant cost independent of the kernel size), according to some embodiments. The vertical convolution filter may also be expressed (or computed) as an explicit Gaussian convolution filter (which may have a linear cost) or as a series of spatially-varying box filters (which may have a constant cost). Spatially varying box filters may, in some embodiments, be computed at constant cost by first computing a vertically-summed linear table and then indexing into that table for each convolution kernel computation. Thus, in some embodiments, accurate approximations to spatially varying Gaussian convolution filters may be computed using multiple horizontal (linear) box filters and vertical summed linear tables.

Soft shadows and glossy reflections, as described herein, may be generated or rendered on graphics hardware, such as on a graphics processing unit or GPU. A GPU is a dedicated graphics rendering device for a personal computer, workstation or game console. Modern GPUs may be very efficient at manipulating and displaying computer graphics and their highly parallel structure may make them more effective than typical CPUs for a range of complex graphical algorithms. For example, a GPU may implement a number of graphics primitive operations in a way that makes executing them much faster than drawing directly to the screen with the host CPU. Many GPUs have programmable shading as part of their capabilities. For example, each pixel can be processed by a short program that could include additional image textures as inputs, and each geometric vertex could likewise be processed by a short program before it was projected onto the screen. These pixel and vertex programs may be called 'shaders' and may implement looping and lengthy floating-point math, and in general are quickly becoming as flexible as CPUs and orders of magnitude faster for image-array operations. GPUs may include support for programmable shaders that can manipulate and vertices, pixels and textures with many of the same operations supported by CPUs, oversampling and interpolation techniques to reduce aliasing, and very high-precision color spaces.

GPUs may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers are most commonly interfaced through a non-standard and often proprietary slot due to size and weight constraints. Such ports may still be considered AGP or PCI express, even if they are not physically interchangeable with their counterparts.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU is extremely memory intensive, an integrated solution finds itself competing for the already slow system RAM with the CPU as it has no dedicated video memory. For instance, system RAM may experience a bandwidth between 2 GB/s and 8 GB/s, while most dedicated GPUs enjoy from 15 GB/s to 30 GB/s of bandwidth. Hybrid solutions also share memory with the system memory, but have a smaller amount of memory on-board than discrete or dedicated graphics cards to make up for the high latency of system RAM.

Figure 7:
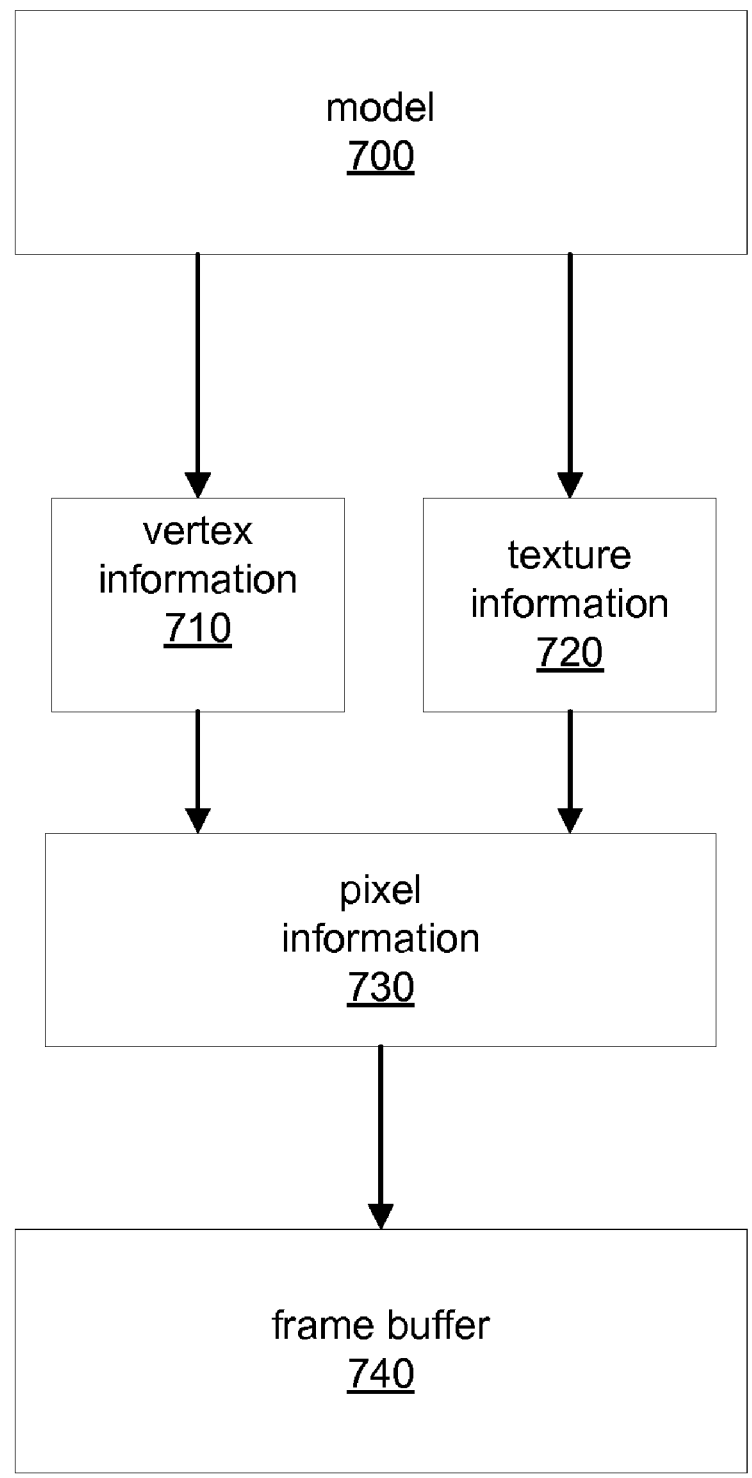
FIG. 7 is a block diagram illustrating one embodiment of the logic flow of rendering an image via a GPU.

A GPU may include programmable vertex and pixel and texture units. For example, FIG. 7 is a block diagram illustrating the logic flow of rendering an image via a GPU. As shown in FIG. 7, the model 700 of the graphics objects to be rendered is supplied from a graphics application executing on the CPU of a system and passes data to the vertex unit 710 and the texture unit 720. For example, graphics application 100, may call various functions of a graphics API, such as OpenGL or DirectX, that in turn instruct the various elements of the GPU to render the images. Vertex unit 710 may describe the geometry of an object while texture unit 720 may specify the skin covering on an object and pixel unit 730 may deal with the view of an object. As noted above, vertex unit 710 and pixel unit 730 may be configured to execute specific vertex and pixel programs, called shaders. For instance, vertex unit 710 may accept vertex information such as position from the model through a vertex buffer. As the same time, texture unit 720 may receive surface information from the model. Both units may complete processing and generate output pixel unit 730. Pixel unit 730 may then complete the lighting and view processing and output the rendered image to frame buffer 740 for display. A frame buffer may be a video output device that drives a video display from a memory buffer containing a complete frame of data. The information in the buffer typically consists of color values for every pixel (point that can be displayed) on the screen.

Figure 8:
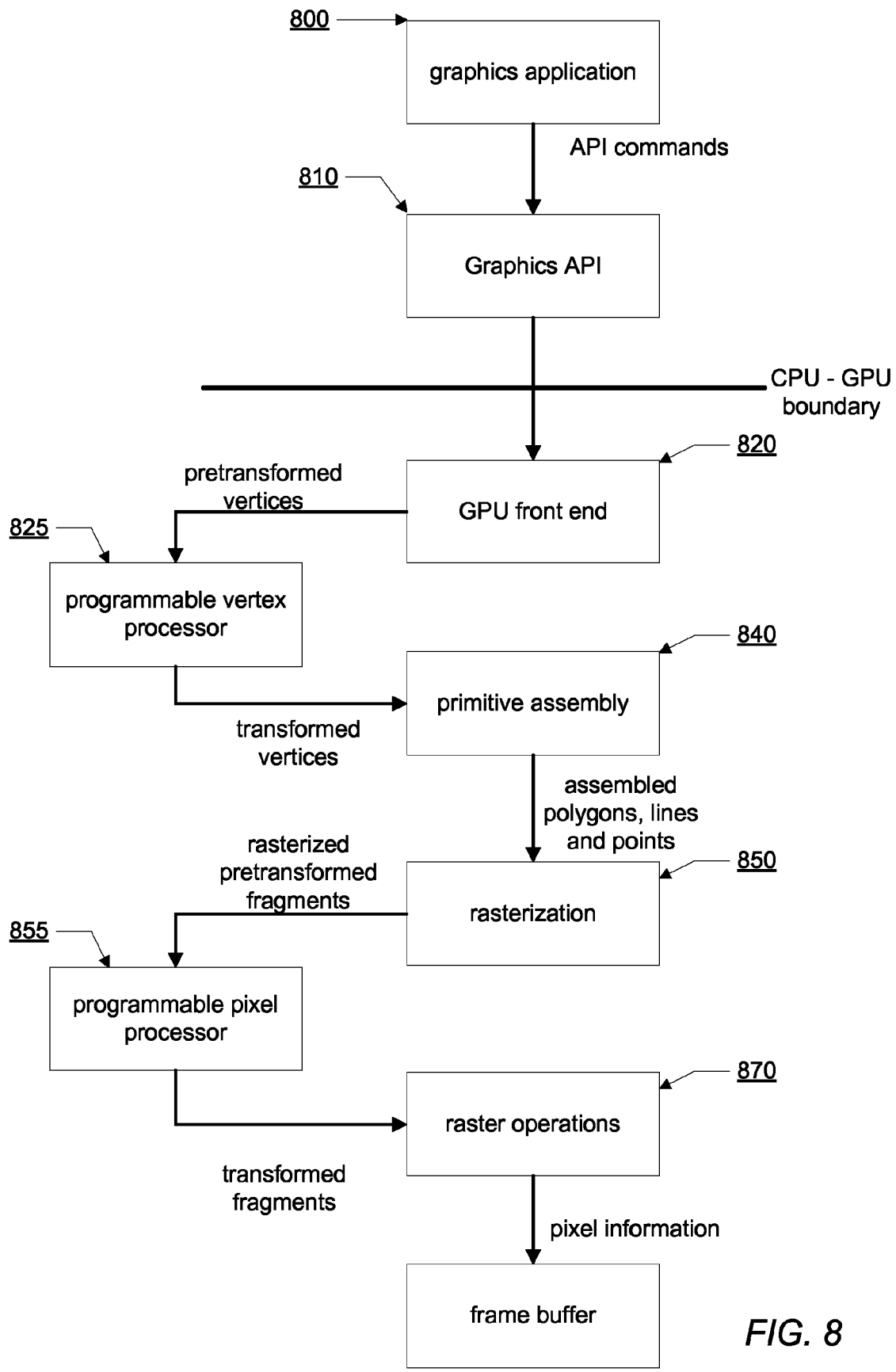
FIG. 8 is a block diagram illustrating one embodiment of the logical view of such a GPU pipeline.

Three-D graphics rendering involves numerous steps that are performed one after another. These steps can be thought of like an assembly line or pipeline. FIG. 8 is a block diagram illustrating one embodiment of the logical view of such a pipeline. A pipeline is a term used to describe the graphics card's architecture and it provides a generally accurate idea of the computing power of a graphics processor. There may be different pipelines within a graphics processor as there may be separate functions being performed at any given time. The pipeline may be broken down into two main stages: the geometry processing stage and the rendering stage. Geometry processing may involve calculations that modify or, in some cases, create new data for vertices. In the rendering stage of the pipeline, a pixel shader may be used to replace previously fixed function texturing, filtering and blending. A programmable shader, such as a pixel or vertex shader, may be considered a piece of code configured to perform different kinds of operations on GPU, including T&L, texturing, etc.

An important advantage of the modern GPU is the ability to be programmed through languages like OpenGL, DirectX or C for Graphics (CG). DirectX and OpenGL are graphics APIs or Application Programming Interfaces. Before 3D graphics APIs, each graphics card company had its own proprietary method of making their graphics card work. Developers were forced to program with vendor-specific paths for each and every type of graphics card they wished to support. This was naturally a very costly and inefficient approach. To solve this problem, 3D graphics APIs were created, so that developers could program their software to be compliant with the API and not with each independent piece of hardware. The responsibility of compatibility was then shifted to the graphics card manufacturers who had to ensure that their drivers where compatible with the API.

There emerged two different APIs, DirectX and OpenGL, both of which are used today. Initially, the APIs were relatively simple. Developers had to mix-and-match visual effects from an unchanging list of pre-programmed effects. Custom shader programming allows developers to create truly custom visual effects for the first time. Thus, graphics application 300 may call various functions supplied by graphics API 310, such as DirectX or OpenGL, in order to utilize the GPU to render a graphic image.

As noted above, vertex processor 825 and pixel processor 855 may be user programmable. A program executed by vertex processor 825 and/or pixel processor 855 may be called a 'shader'. Vertex shaders may deform or transform 3D elements.

A pixel processor, such as pixel processor 855, may be a component on the graphics chip devoted exclusively to pixel shader programs. These processing units may only perform calculations regarding pixels. Because pixels represent color values, pixel shaders may be used for all sorts of graphical effects. Pixel shaders may change pixel colors based on various types of input. For example, when the object is lit by a light source in a 3D scene in which some colors appear brighter while other colors create shadows, both the brighten objects and the shadows may be generated by changing various pixels' color information in a pixel shader. As noted above, a GPU may also include vertex processors, such as vertex processor 825, configured to execute vertex shaders that affect vertices.

A vertex shader may receive streams of vertex data from the graphics pipeline perform operations on the data and output the transformed vertex data to the graphics pipeline for further processing. For example, vertex processor 825 may receive pretransformed vertex data from GPU front end 820 and output transformed vertices to primitive assembly unit 840. Subsequently, the assembled polygons, lines and points may be sent to a rasterization unit 850. Pixel processor 855 may receive rasterized pretransformed pixel information, also called fragments, execute the applicable pixel shaders and output transformed fragments (pixel information) to a raster operations unit 870 that may then output the final pixel information to frame buffer Raster operation processors (ROPs), such as raster operations unit 870, may be responsible for writing pixel data to memory.

A GPU may also include texture mapping units (TMUs). Textures need to be addressed and filtered. This job is frequently performed by TMUs that work in conjunction with pixel and vertex shader units. The TMU's job is to apply texture operations to pixels. Data communicated between the graphics processing unit and the rest of the computer may travel through the graphics card slot or other interface.

A technique called texture mapping may be used to map a digital image onto a surface of a graphic object. The image data mapped onto the object may be called a texture, and its individual elements may be called texels. The rectangular texture resides in its own texture coordinate space, or the texture may be defined by a procedure. At each rendered pixel, selected texels may be used to substitute for or to scale one or more surface properties, such as diffuse color components. One pixel may often mapped by a number of texels. For example, when a texture is mapped to a polygon, it is common to assign texture map coordinates directly onto the polygon's vertices. A number of different textures may be stored in a single texture atlas.

In the same manner that color can be assigned to a pixel, transparency or opacity can be assigned to it as well. Opacity and transparency are complements of each other in the sense that high opacity implies low transparency. The opacity may be considered a normalized quantity in the range [0,1], or alternatively in a discrete form in the range [0, 255] for use with 8 bit hardware. Opacity a may be related to transparency t by the expression: $a=1-t$. If an object has high opacity ($a=1$), the objects and light behind it are shielded and not visible. If at the same time the object has a non-zero color value, it is "emitting" light so it is visible. On the other hand, if $a<1$, the object is transparent and objects behind it are visible through it. If $a=0$, the object is invisible whatever the colors are.

While the techniques described herein may be used with area lights of any, arbitrary shape generally, for ease of discussion, the examples and exemplary embodiments described and illustrated include rectangular light sources.

Figure 9:
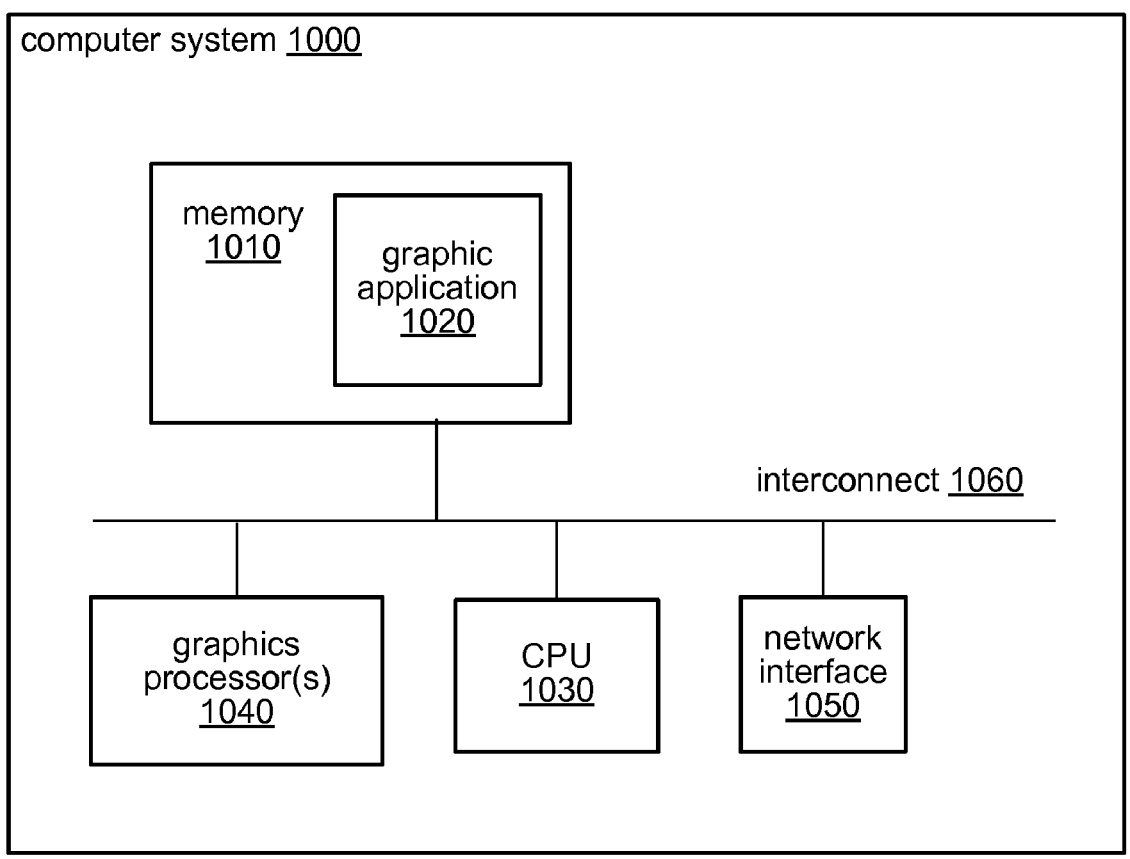
FIG. 9 is block diagram illustrating one embodiment of a computer system capable of generating soft shadows and/or glossy reflections on a GPU using a spatially varying convolution, as described herein.

The generation of soft shadows and/or glossy reflections, as described herein, may be implemented on various types of computer systems. Referring to FIG. 9, computer system 1000 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

A graphics application configured to generate soft shadows and/or glossy reflections as described herein, such as graphics application 1020, may represent various types of graphics applications, such as painting, publishing, photography, games, animation, and other applications. Additionally, such a graphics application may utilize a graphics processor when rendering or displaying images that include soft shadows and/or glossy reflections, according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them must faster than drawing directly to the screen with a host central processing unit (CPU), such as CPU 1030. Please note that functionality and/or features described herein as being part of, or performed by, graphics application 1020 may, in some embodiments, be part of, or performed by, one or more graphics processors, such as graphics processor 1040.

A graphics application capable of generating soft shadows and/or glossy reflections, as described herein, may be provided as a computer program product, or software, that may include a computer-readable storage medium having stored thereon instructions, which may be used to program a computer system (or other electronic devices) to generate soft shadows and/or glossy reflections, as described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1000 may include a processor unit (CPU) 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1060 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. The CPU 1030, the network interface 1050, and the memory 1010 may be coupled to the interconnect 1060. It should also be noted that one or more components of system 1000 might be located remotely and accessed via a network. One or more of the memories 1010 may embody a graphics application 1020.

In some embodiments, memory 1010 may include program instructions configured to generate soft shadows and/or glossy reflections, as described herein. A graphics application capable of generating soft shadows and/or glossy reflections as described herein may be implemented in any of various programming languages or methods. For example, in one embodiment, graphics application 1020 may be JAVA based, while in another embodiments, it may be implemented using the C or C++ programming languages. In other embodiments, such a graphics application may be implemented using specific graphic languages specifically for developing programs executed by specialized graphics hardware, such as GPU 1040. In addition, such a graphics application may be embodied on memory specifically allocated for use by graphics processor(s) 1040, such as memory on a graphics board including graphics processor(s) 1040. Thus, memory 1010 may represent dedicated graphics memory as well as general-purpose system RAM.

Network interface 1040 may be configured to enable computer system 1000 to communicate with other computers, systems or machines, such as across network 100, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 2, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM. Data communicated between the graphics processing unit and the rest of the computer may travel through the graphics card slot or other interface, such as interconnect 1060.

While graphics application 1020 has been described herein with reference to various embodiments, it will be understood that these embodiments are illustrative and that the scope of the present invention is not limited to them. Many variations, modifications, additions, and improvements are possible. More generally, the present invention is described in the context of particular embodiments. For example, the blocks and logic units identified in the description are for ease of understanding and not meant to limit the invention to any particular embodiment. Functionality may be separated or combined in blocks differently in various realizations or described with different terminology.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
 for each of a plurality of pixels within a reflected region of a reflecting plane, wherein the reflected region corresponds to an area of the reflecting plane onto which color information from an occluding plane is reflected:
  determining, by a computer, a size and shape of a spatially-varying convolution area corresponding to a ray projection projected from the respective pixel through the occluding plane onto a background plane, wherein the determined size of the convolution area for the respective pixel is different than the determined size of another of the plurality of pixels, and wherein the determined size of the convolution area varies according to a distance between the occluding plane and the background plane;
  computing, by the computer, a reflection value for the respective pixel based on a plurality of color values for the occluding plane within the convolution area; and
  rendering, by the computer, the reflected region of the reflecting plane according to the respective reflection values.

2. The method of claim 1, wherein said computing the reflection value comprises:
 accessing a summed area table to obtain the reflection value, wherein the summed area table includes a plurality of values, each corresponding to reflection values for a respective subset of the plurality of color values; and
 wherein said accessing the summed area tables comprises accessing a reflection value for a subset of the color values corresponding to the convolution area.

3. The method of claim 1, wherein said computing the reflection value comprises accessing a MIP-map data structure to obtain the reflection value, wherein the MIP-map includes a plurality of levels, wherein each level comprises respective values corresponding to an aggregate of color value for the occluding plane, and wherein each level corresponds to a different size aggregate.

4. The method of claim 1, wherein said computing the reflection value comprises applying a horizontal linear convolution to each of a plurality of rows of the color values to obtain a corresponding plurality of horizontal values.

5. The method of claim 4, wherein said applying the horizontal convolution to each of the plurality of rows comprises varying a size of the horizontal linear convolution across the plurality of rows.

6. The method of claim 1, wherein said computing the reflection value comprises applying a vertical linear convolution to each of a plurality of columns of the color values to obtain a corresponding plurality of vertical values.

7. The method of claim 6, wherein said applying the vertical linear convolution to each of the plurality of columns comprises varying a size of the vertical linear convolution along each of the plurality of columns.

8. The method of claim 1, wherein said computing the reflection value comprises:
applying a horizontal linear convolution to each of a plurality of rows of the color values, wherein said applying the horizontal convolution obtains a plurality of intermediate values; and
applying a vertical linear convolution to the plurality of intermediate values, wherein said applying the vertical convolution obtains a corresponding plurality of vertical values.

9. The method of claim 1, further comprising applying a graphical image warp function to the rendered reflected region, wherein the warp function modifies the reflection value for at least one of the plurality of pixels.

10. A system, comprising:
a processor; and
memory coupled to the processor, wherein the memory comprises program instructions executable by the processor to:
for each of a plurality of pixels within a reflected region of a reflecting plane, wherein the reflected region corresponds to an area of the reflecting plane onto which color information from an occluding plane is reflected:
determine a size and shape of a spatially-varying convolution area corresponding to a ray projection projected from the respective pixel through the occluding plane onto a background plane, wherein the determined size of the convolution area for the respective pixel is different than the determined size of another of the plurality of pixels, and wherein the determined size of the convolution area varies according to a distance between the occluding plane and the background plane;
compute a reflection value for the respective pixel based on a plurality of color values for the occluding plane within the convolution area; and
render the reflected region of the reflecting plane according to the respective reflection values.

11. The system of claim 10, wherein in said computing the reflection value, the program instructions are executable to:
access a summed area table to obtain the reflection value, wherein the summed area table includes a plurality of values, each corresponding to reflection values for a respective subset of the plurality of color values; and
wherein accessing the summed area tables comprises accessing a reflection value for a subset of the color values corresponding to the convolution area.

12. The system of claim 10, wherein in said computing the reflection value the program instructions are executable to: access a MIP-map data structure to obtain the reflection value, wherein the MIP-map includes a plurality of levels, wherein each level comprises respective values corresponding to an aggregate of color value for the occluding plane, and wherein each level corresponds to a different size aggregate.

13. The system of claim 10, wherein in said computing the reflection value the program instructions are executable to apply a horizontal linear convolution to each of a plurality of rows of the color values to obtain a corresponding plurality of horizontal values.

14. The system of claim 13, wherein the program instructions are further executable to vary a size of the horizontal linear convolution across the plurality of rows.

15. The system of claim 10, wherein in said computing the reflection value the program instructions are executable to apply a vertical linear convolution to each of a plurality of columns of the color values to obtain a corresponding plurality of vertical values.

16. The system of claim 15, wherein the program instructions are further executable to vary a size of the vertical linear convolution along each of the plurality of columns.

17. The system of claim 10, wherein the processor is a graphical processing unit (GPU).

18. The system of claim 17, wherein the program instructions comprise a pixel shader program executable by the GPU.

19. A non-transitory computer-readable, storage medium, comprising program instructions executable to implement:
for each of a plurality of pixels within a reflected region of a reflecting plane, wherein the reflected region corresponds to an area of the reflecting plane onto which color information from an occluding plane is reflected:
determining a size and shape of a spatially-varying convolution area corresponding to a ray projection projected from the respective pixel through the occluding plane onto a background plane, wherein the determined size of the convolution area for the respective pixel is different than the determined size of another of the plurality of pixels, and wherein the determined size of the convolution area varies according to a distance between the occluding plane and the background plane;
computing a reflection value for the respective pixel based on a plurality of color values for the occluding plane within the convolution area; and
rendering the reflected region of the reflecting plane according to the respective reflection values.

20. The non-transitory computer-readable, storage medium of claim 19, wherein in said computing the reflection value the program instructions are executable to implement:
accessing a summed area table to obtain the reflection value, wherein the summed area table includes a plurality of values, each corresponding to reflection value for a respective subset of the plurality of color values; and
wherein said accessing the summed area tables comprises accessing a reflection value for a subset of the color values corresponding to the convolution area.

21. The non-transitory computer-readable, storage medium of claim 19, wherein in said computing the reflection value the program instructions are executable to implement accessing a MIP-map data structure to obtain the reflection value, wherein the MIP-map includes a plurality of levels, wherein each level comprises respective values corresponding to an aggregate of color value for the occluding plane, and wherein each level corresponds to a different size aggregate.

22. The non-transitory computer-readable, storage medium of claim 19, wherein in said computing the reflection value the program instructions are executable to implement applying a horizontal linear convolution to each of a plurality of rows of the color values to obtain a corresponding plurality of horizontal values.

23. The non-transitory computer-readable, storage medium of claim 19, wherein in said computing the reflection value the program instructions are executable to implement applying a vertical linear convolution to each of a plurality of columns of the color values to obtain a corresponding plurality of vertical values.

* * * * *